(12) United States Patent
Yen et al.

(10) Patent No.: US 12,051,814 B2
(45) Date of Patent: Jul. 30, 2024

(54) FLAME-RETARDANT COMPOSITIONS FOR ENERGY STORAGE DEVICES, METHODS OF MANUFACTURE THEREOF AND BATTERIES CONTAINING THE SAME

(71) Applicant: GM Global Technology Operations LLC, Detroit, MI (US)

(72) Inventors: Chih-Hung Yen, Bloomfield Hills, MI (US); Taeyoung Han, Bloomfield Hills, MI (US); David R. Clark, Grosse Pointe Woods, MI (US); Su Jung Han, West Bloomfield, MI (US); Kuo-huey Chen, Troy, MI (US); Gustavo Cibrian Salazar, Belle River (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 442 days.

(21) Appl. No.: 17/396,245

(22) Filed: Aug. 6, 2021

(65) Prior Publication Data
US 2023/0057172 A1    Feb. 23, 2023

(51) Int. Cl.
*H01M 50/143*    (2021.01)
*C09K 21/02*    (2006.01)
*H01M 10/613*    (2014.01)
*H01M 10/6551*    (2014.01)
*H01M 10/6554*    (2014.01)
(Continued)

(52) U.S. Cl.
CPC ........... *H01M 50/143* (2021.01); *C09K 21/02* (2013.01); *H01M 10/613* (2015.04); *H01M 10/6551* (2015.04); *H01M 10/6554* (2015.04); *H01M 50/204* (2021.01); *H01M 50/213* (2021.01); *H01M 50/222* (2021.01); *H01M 50/231* (2021.01); *H01M 50/233* (2021.01); *H01M 50/367* (2021.01); *H01M 50/375* (2021.01);
(Continued)

(58) Field of Classification Search
CPC .......................... C09K 21/02; H01M 10/613; H01M 10/6551; H01M 10/6554; H01M 2200/00; H01M 50/143; H01M 50/204; H01M 50/213; H01M 50/222; H01M 50/231; H01M 50/233; H01M 50/367; H01M 50/375; Y02E 60/10
See application file for complete search history.

(56) References Cited

U.S. PATENT DOCUMENTS 6,015,510 A    1/2000    Jacobson et al.
6,025,419 A    2/2000    Kasowski et al.
(Continued)

*Primary Examiner* — Lingwen R Zeng
(74) *Attorney, Agent, or Firm* — CANTOR COLBURN LLP

(57) ABSTRACT

Disclosed herein is a battery module comprising a plurality of battery cells encased in an outer shell. The outer shell has disposed on an inner surface a flame retardant layer that comprises expandable graphite. The expandable graphite is operative to expand during an thermal event that results in an increase in battery module temperature. Disclosed herein too is a method comprising disposing in a battery module a flame retardant layer; where the battery module comprises a plurality of battery cells encased in an outer shell. The outer shell has disposed on an inner surface a flame retardant layer that comprises expandable graphite. The expandable graphite is operative to expand during an thermal event that results in an increase in battery module temperature.

19 Claims, 5 Drawing Sheets

(51) Int. Cl.
  *H01M 50/204* (2021.01)
  *H01M 50/213* (2021.01)
  *H01M 50/222* (2021.01)
  *H01M 50/231* (2021.01)
  *H01M 50/233* (2021.01)
  *H01M 50/367* (2021.01)
  *H01M 50/375* (2021.01)

(52) U.S. Cl.
  CPC .......... *H01M 2200/00* (2013.01); *Y02E 60/10* (2013.01)

(56) References Cited

U.S. PATENT DOCUMENTS

| | | | |
|---|---|---|---|
| 2005/0170238 A1* | 8/2005 | Abu-Isa | H01M 50/117 429/82 |
| 2018/0114965 A1 | 4/2018 | Doyle et al. | |
| 2022/0123409 A1* | 4/2022 | Roethinger | H01M 10/054 |
| 2022/0200039 A1 | 6/2022 | Xiao et al. | |
| 2023/0059036 A1 | 2/2023 | Xiao et al. | |

* cited by examiner

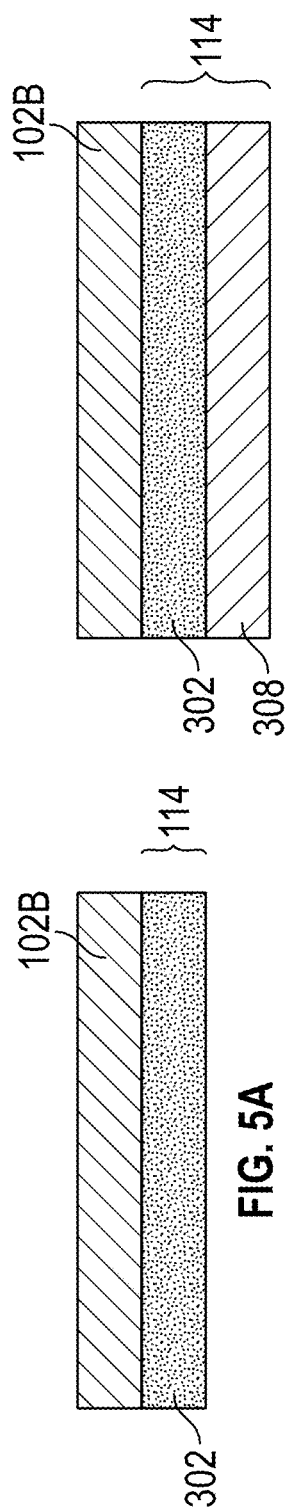
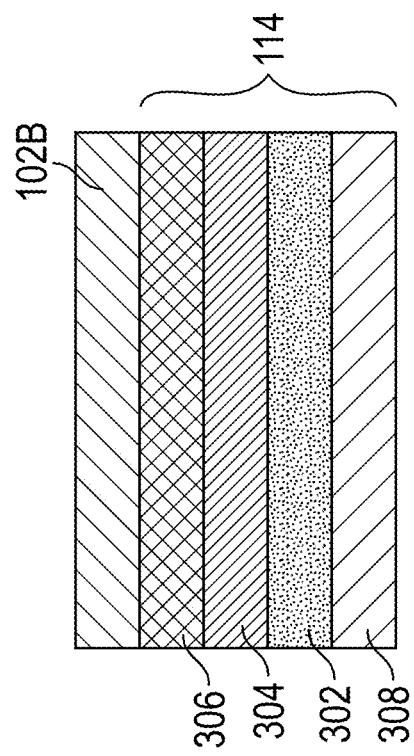
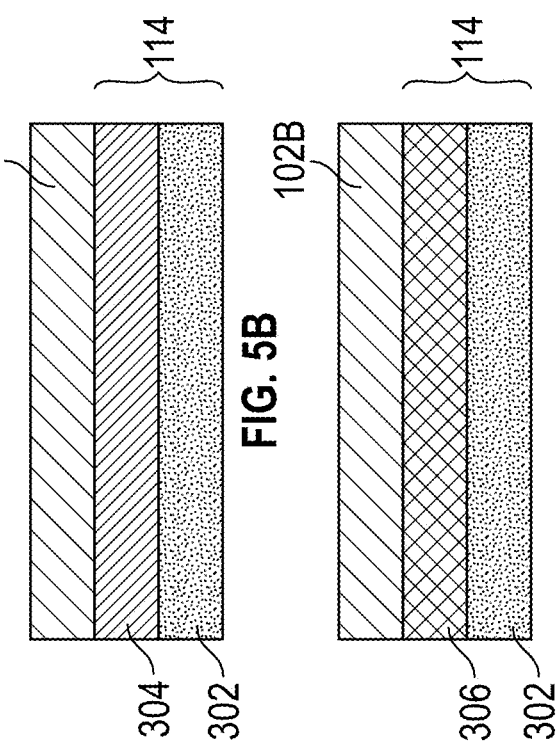
FIG. 5A
FIG. 5B
FIG. 5C
FIG. 5D
FIG. 5E

FLAME-RETARDANT COMPOSITIONS FOR ENERGY STORAGE DEVICES, METHODS OF MANUFACTURE THEREOF AND BATTERIES CONTAINING THE SAME

INTRODUCTION

This disclosure relates to flame-retardant compositions for energy storage devices, methods of manufacturing thereof and articles comprising the same. In particular, this disclosure relates to flame-retardant compositions for batteries, methods of manufacture thereof and to battery modules and packs that contain the flame-retardant compositions.

Battery modules comprise a plurality of battery cells (often called secondary batteries) that are rechargeable. Rechargeable battery cells render them useful in a variety of modern technical applications such as electronic devices, electric bicycles, hybrid cars, electric cars, and the like. Battery modules sometimes undergo thermal events one of which is thermal runaway, where the heat generated by a source (e.g. a battery cell) is greater than the ability of the module to dissipate the heat safely to its surroundings. This results in temperature increases in the battery module. Thermal runaway often occurs when the battery is short circuited or damaged.

The thermal runaway phenomenon is undesirable because a thermal event occurring in one battery cell in the battery module may trigger corresponding thermal events in adjacent battery cells thereby creating a larger problem. It is therefore desirable to provide a flame-retardant material that may be used in energy storage devices such as batteries, capacitors, ultracapacitors, and so on, that can increase the flame retardancy of the energy storage device.

SUMMARY

Disclosed herein is a battery module comprising a plurality of battery cells encased in an outer shell. The outer shell has disposed on an inner surface a flame retardant layer that comprises expandable graphite. The expandable graphite is operative to expand during a thermal event that results in an increase in battery module temperature.

In an embodiment, the outer shell contains an exit port that is operative to permit the egress of hot gases and where the flame retardant layer expands to create channels that lead the hot gases to the exit port.

In another embodiment, the flame retardant layer is arranged to contact a thermal distribution plate that has a higher coefficient of thermal conductivity than a material used in the outer wall.

In another embodiment, the thermal distribution plate is arranged at the top of the battery module to rapidly contact rising hot gases.

In another embodiment, the expandable graphite undergoes exfoliation during a thermal event.

In yet another embodiment, the expandable graphite is intercalated with a flame retardant.

In yet another embodiment, the expandable graphite has particles of different sizes that are arranged to facilitate differential expansion based on particle size that creates a channel for hot gases.

In yet another embodiment, some expandable graphite particles are pre-expanded prior to inclusion in the flame retardant layer.

In yet another embodiment, the flame retardant layer comprises unexpanded graphite particles of different initial particle sizes combined with pre-expanded particles with different levels of pre-expansion to tailor expansion of the flame retardant layer to produce channels that facilitate gas migration to an exit port.

In yet another embodiment, the particle size decreases with increasing distance from the outer shell.

In yet another embodiment, larger expandable graphite particles expand more than smaller expandable graphite particles and where a particle closest to the outer shell expands the most while those further away from the wall expand the least upon encountering a thermal event.

In yet another embodiment, the flame retardant layer comprises a polymeric binder that encompasses the expandable graphite.

In yet another embodiment, the polymeric binder is a polyurethane or a polysiloxane.

In yet another embodiment, the flame retardant layer is arranged on the outer periphery of the thermal distribution plate and where the thermal distribution plate is manufactured from aluminum.

Disclosed herein is a method comprising disposing in a battery module a flame retardant layer; where the battery module comprises a plurality of battery cells encased in an outer shell. The outer shell has disposed on an inner surface a flame retardant layer that comprises expandable graphite. The expandable graphite is operative to expand during a thermal event that results in an increase in battery module temperature.

In an embodiment, the method further comprises arranging the expandable graphite to produce a channel that facilitates gas migration to an exit port during a thermal event.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5A depicts one exemplary arrangement of the expandable graphite layer in the battery module;

FIG. 5B depicts another exemplary arrangement of the expandable graphite layer in the battery module;

FIG. 5C depicts another exemplary arrangement of the expandable graphite layer in the battery module;

FIG. 5D depicts another exemplary arrangement of the expandable graphite layer in the battery module; and FIG. 5E depicts another exemplary arrangement of the expandable graphite layer in the battery module.

DETAILED DESCRIPTION

The following description is merely exemplary in nature and is not intended to limit the present disclosure, its application or uses.

Disclosed herein is a fire-retardant composition that is disposed in a battery module. The fire-retardant composition is designed to minimize the effects of thermal events caused by excess heat and gas produced in a battery cell that is part of a battery module. This flame-retardant composition comprises expandable graphite flakes. The expandable graphite may be used singly or in combination with other fire-retardant materials some of which may be intercalated into the expandable graphite. It can be used to fill in voids in the battery module. The expandable graphite is arranged in the battery module such that it expands in a predictable, predesigned pathway inside the module during a thermal event. The predesigned pathway directs hot, combustible gases to ports located on the outer shell of the module. The hot gases exit the module thereby mitigating the effect of the thermal event. The battery module is thus designed with an outer shell that contains ports and the expandable graphite is arranged to expand in such a manner so as to channel hot gases to the ports during a thermal event.

The thermal event as detailed herein pertains to an event that brings about increasing temperatures where the battery module cannot dissipate the heat faster than it is generated in the module. One example of such an thermal event is thermal runaway.

Figure 1:
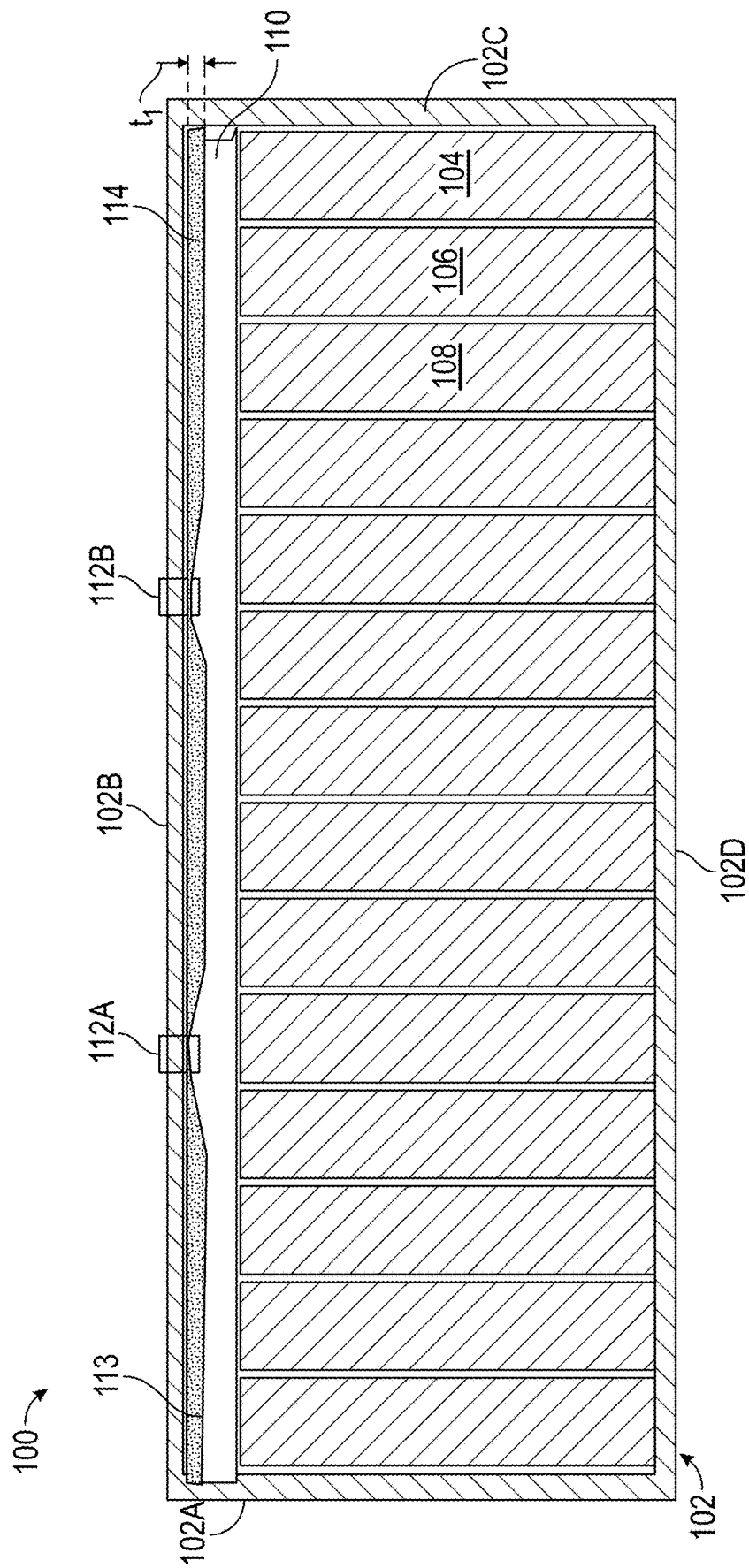
FIG. 1 is a depiction of the exemplary battery module prior to activation of the expandable graphite in the flame retardant layer.
Figure 2:
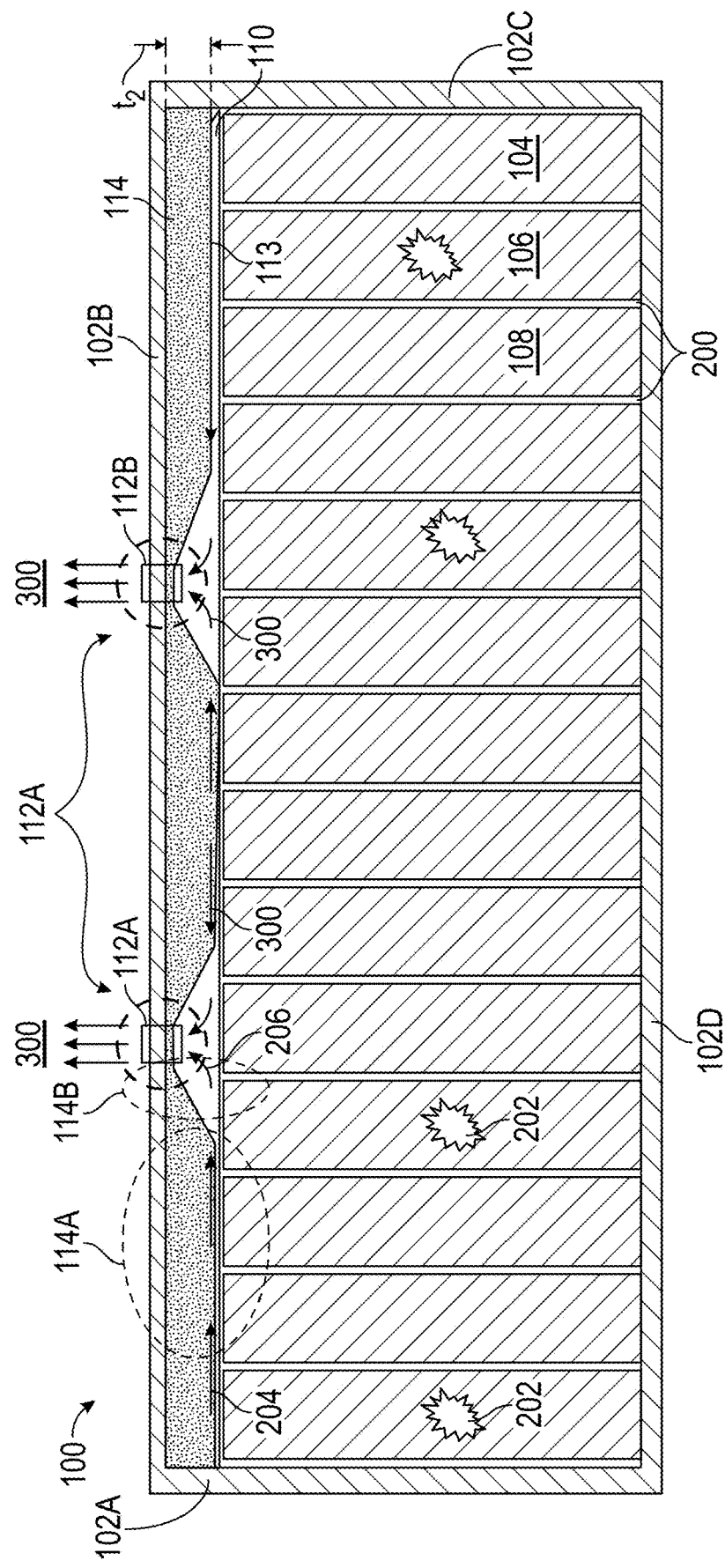
FIG. 2 is a depiction of the exemplary battery module after activation of the expandable graphite in the flame retardant layer.

With reference to FIGS. 1 and 2, an exemplary battery module 100 comprises a plurality of battery cells 104,106, 108, and so on, encased in an outer shell 102. The outer shell 102 has disposed on an inner surface a flame retardant layer 114 that contains the expandable graphite. Other layers may also be a part of the flame retardant layer. These are detailed herein. The FIG. 1 is a depiction of the exemplary battery module prior to activation of the expandable graphite in the flame retardant layer 114, while the FIG. 2 is a depiction of the exemplary battery module after activation of the expandable graphite in the flame retardant layer. It is to be noted that the flame retardant layer 114 has a thickness $t_1$ prior to activation and a greater thickness $t_2$ after activation.

The outer shell 102 is preferably continuous with four walls, a left side wall 102A, a top wall 102B, a right side wall 102C and a bottom wall 102D. On the top wall 102B of the battery module 100 are two ports 112A and 112B. These ports act as vents for the egress of excess thermal energy and hot gases 300 potentially created during an thermal event. The ports may be left open or alternatively sealed with a lid that can be easily displaced by gases generated during the thermal event.

While in the FIG. 1, the ports are on the top of the outer shell 102B, they may be placed anywhere along the outer shell i.e., (they may be located on the left side wall 102A, the top wall 102B, the right side wall 102C and/or the bottom wall 102D).

The battery cells 104,106,108, and so on, are surrounded by the outer shell 102. Each battery cell is separated from one another by a void space 200 that may be filled with the expandable graphite from the flame retardant layer. The outer shell 102 has disposed on its inner surface a flame retardant layer 114 that is held in place by a ceramic membrane 113 that permits the graphite to expand in such a manner that it does not block the ports 112A or 112B, nor does it block all pathways leading to the ports 112A or 112B during the expansion (of the expandable graphite). The FIG. 1 is a depiction of the battery module prior to the activation of the expandable graphite.

The ceramic membrane 113 is made of a material that can withstand high temperature and transmit heat to the expandable graphite such that it permits expansion of the graphite to create a narrow pathway in space 110 that directs the flow of potential excess thermal energy (in the form of combustible gases and heat) 300 toward the ports 112A and 112B. The combustible gases (now under pressure) 300 will displace any seal located on the ports 112A and 112B to escape from the outer shell 102.

The ceramic membrane 113 is preferably an inorganic ceramic membrane (without any embedded organic matter contained therein) that displays high mechanical strength, resistance to temperature changes and chemical stability. The membranes can withstand a very broad range of temperatures and pH conditions due to its thermal and chemically inert ceramic character and preferably does not demonstrate irreversible structural change that may affect its operational behavior. The ceramic membrane 113 preferably can expand at higher temperatures above 750° C. under pressure from the expanding expandable graphite in the flame retardant layer 114 (the graphite expands upon being subjected to elevated temperatures) contained between the ceramic membrane 113 and the outer wall 102, but does not rupture or collapse.

Microporous glasses, zeolites, titania, α-alumina, γ-alumina, and zirconia are commonly used in ceramic membrane materials. The most common ceramic membranes comprise aluminum, silicon, titanium or zirconium oxides, with titanium and zirconium oxides being more stable than aluminum or silicon oxides. Membranes may also be manufactured from mixed oxides, generally of two of the aforementioned oxides. The ceramic membrane may optionally have support layers that are manufactured from α-aluminum oxide or silicon carbide with open pores.

The methods used to prepare the ceramic membrane includes the following methods: chemical extraction, sol-gel method, solid-state sintering, phase-separation, chemical vapor deposition, or a combination thereof. The ceramic membrane is preferably porous (having pore sizes of 10 nanometers to 50 micrometers) so that heated gases generated during the thermal event can contact the expandable graphite layer 114 to promote expansion of the graphite thereby facilitating an escape of the gases through exit ports specially located to enable this escape.

Expandable graphite, also referred to as graphite flakes, when heated, will expand to a multiple of its volume. The expansion starting temperature is around 200° C. When heated to a suitable activation temperature (such as, for example above 200° C.), expandable graphite will expand and form an intumescent layer on the surface of the material it is disposed upon. Upon exposure to such activation temperatures, the flakes of expandable graphite expand in dimension by as much as about 80 to about 1,000 times the original volume in an accordion-like fashion, (i.e., in the direction perpendicular to the crystalline planes of the constituent graphite particles). These expanded flakes of graphite as defined above, are also known as exfoliated graphite or flexible graphite and are vermiform (wormlike) in appearance. This expansion slows down the spread of a potential thermal event and counteracts the formation of toxic gases and smoke that could potentially result from a thermal event.

In an embodiment, the expandable graphite can be intercalated with flame-retardant materials that are positioned between the graphene layers that form graphite. The term "intercalated graphite" as used herein represents graphite, which has been intercalated in the presence of, for example, an oxidizing agent as further described below. In the method of making intercalated graphite, natural graphite flakes are intercalated by dispersing the flakes in a solution containing an oxidizing agent. Suitable oxidizing agents include but are not limited to nitric acid, potassium chlorate, chromic acid, potassium permanganate, potassium chromate, potassium dichromate, perchloric acid, and the like, and combinations thereof.

A preferred intercalating solution is one wherein an oxidizing agent (e.g., nitric acid, perchloric acid, chromic acid, potassium permanganate, hydrogen peroxide, iodic or periodic acids) is dissolved in either a sulfuric acid, or a solution of sulfuric acid with phosphoric acid. The intercalation solution may also contain metal halides such as ferric chlorides, bromides, iodides, fluorides, and the like. Other suitable intercalants for graphite are water, potassium, rubidium, cesium, lithium, bromine and the like. After the flakes are intercalated with the intercalating solution, excess solution is drained from the flakes. The wet flakes are then washed with water and dried. The thus treated flakes of graphite are referred to as "intercalated graphite".

The intercalated graphite may also be intercalated with flame retardant materials.

Examples of suitable flame-retardant materials are metal hydroxides, halogenated flame-retardants, phosphorus containing flame-retardants, nitrogen-containing flame-retardants, or the like, or a combination thereof.

Metal hydroxides act as flame-retardants by undergoing a reaction (with itself or with a metal oxide) to produce water in the presence of heat. The water may act to douse the flame or alternatively, surround the flammable material thus preventing oxygen from contacting the material and setting it aflame. In an embodiment, metal oxides may be used in conjunction with the metal hydroxides to function as flame-retardants. Examples of metal hydroxides are magnesium hydroxide, aluminum hydroxide, or a combination thereof. Examples of metal oxides are magnesium oxide, aluminum oxide, or a combination thereof.

In some embodiments, the phosphorus containing flame-retardant comprises an organophosphate ester. Exemplary organophosphate ester flame-retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), or the like, or a combination thereof.

In some embodiments the organophosphate ester comprises a bis-aryl phosphate having the formula:

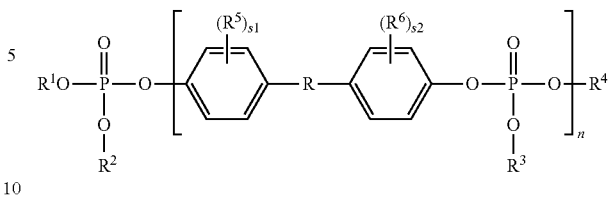

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame-retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula:

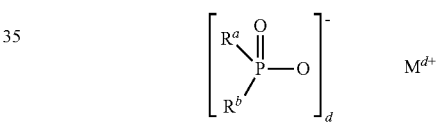

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

In some embodiments, the flame-retardant comprises a nitrogen-containing flame-retardant. Nitrogen-containing flame-retardants include those comprising a nitrogen-containing heterocyclic base and a phosphate or pyrophosphate or polyphosphate acid. In some embodiments, the nitrogen-containing flame-retardant has the formula:

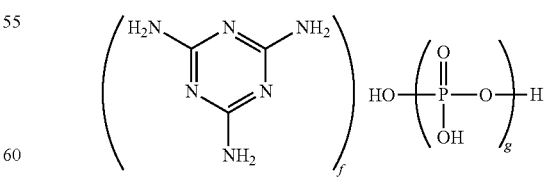

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame-retardant is melamine phosphate (CAS Reg. No. 20208-95-1). When g is 2, the nitrogen-containing flame-retardant is melamine pyrophosphate (CAS Reg. No. 15541 60-3). When g is, on average, greater than 2, the nitrogen-containing flame-retardant is a melamine polyphosphate (CAS Reg. No. 56386-64-2). In some embodiments, the nitrogen-containing flame-retardant is melamine pyrophosphate, melamine polyphosphate, or a mixture thereof. In some embodiments in which the nitrogen-containing flame-retardant is melamine polyphosphate, g has an average value of greater than 2 to 10,000, specifically 5 to 1,000, more specifically 10 to 500. In some embodiments in which the nitrogen-containing flame-retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine or by heating melamine pyrophosphate under nitrogen at 290° C. to constant weight. In some embodiments, the nitrogen-containing flame-retardant comprises melamine cyanurate.

The nitrogen-containing flame-retardant can have a low volatility. For example, in some embodiments, the nitrogen-containing flame-retardant exhibits less than 1 percent weight loss by thermogravimetric analysis when heated at a rate of 20° C. per minute from 25 to 280° C., specifically 25 to 300° C., more specifically 25 to 320° C.

In an embodiment, the intercalated graphite may be prepared by oxidizing the graphite particles in the presence of an oxidizing agent, the flame retardant material and a solvent. The oxidizing agent facilitates an expansion of the graphene layers in the graphite, while the flame retardant material diffuses into the expanded spaces between the graphene layers. The solvent serves to dissolve the flame retardant material and facilitates compatibilization between the oxidizing agent and the flame retardant material.

In one embodiment, the flame retardant compositions may comprise expandable graphite, which has been independently exfoliated along with intercalated graphite. When combinations of intercalated graphite and expandable graphite are used in intumescent compositions the intercalated graphite is preferably used in an amount of greater than about 15 wt %, preferably greater than about 25 wt %, preferably greater than about 30 wt % of the weight of the mixture of intercalated and expandable graphite.

In an embodiment, the expandable and/or the intercalated graphite flakes may be embedded in a polymeric foam to form the expandable graphite layer 114 (see FIG. 1). The polymers used in the polymeric foams may be thermoplastic polymers or thermosetting polymers. These polymers are listed below in the section on aerogels. A suitable foamed polymeric material that may be used to bind the expandable and/or intercalated graphite for use in the graphite layer 114 is polyurethane.

The expandable graphite may also be mixed fire-retardant chemicals (such as those listed above) or with other thermal barrier materials. Suitable examples of other thermal barrier materials include porous materials such as zeolites, aerogels, fumed metal oxides, metallic organic frameworks (MoFs), or the like, or a combination thereof.

Zeolites

Zeolites are a form of molecular sieves that are microporous crystalline solids with well-defined structures and comprise silicon, aluminum and oxygen in their framework and may also comprise cations within their pores. The zeolites (like all of the porous media detailed herein) may be added to the flame retardant composition singly or may be added to the flame retardant compositions with a portion of the flame retardant particles (listed above) disposed thereon.

The zeolites have a crystalline framework of interconnected alumina and silica, in particular, cross-linked alumina and silica via a sharing of oxygen atoms, and thus can be characterized by the silica-to-alumina ratio (SAR). In general, as a zeolite's SAR increases, the zeolite displays increased hydrothermal stability. A defining feature of a molecular sieve is its crystalline or pseudo-crystalline structure which is formed by molecular tetrahedral cells interconnected in a regular and/or repeating manner to form a framework.

Zeolites have a three-dimensional molecular framework that arises from the orientation of their interconnected cells. The cells of these molecular sieves typically have volumes on the order of a few cubic nanometers and cell openings (also referred to as "pores" or "apertures") on the order of a few angstroms in diameter. The cells are defined by the ring size of their pores, where, for example, the term "8-ring" refers to a closed loop that is built from 8 tetrahedrally coordinated silicon (or aluminum) atoms and 8 oxygen atoms. In certain zeolites, the cell pores are aligned within the framework to create one or more channels which extend through the framework, thus creating a mechanism to restrict the ingress or passage of different molecular or ionic species through the molecular sieve, based on the relative sizes of the channels and molecular or ionic species.

This feature is useful because the zeolites may be sized to permit certain combustible gases generated during a thermal event to enter its pores (and be deprived of oxygen) while certain other gases (that may not be combustible) are excluded from entering the porous substrate. This feature can minimize the sequential spreading of a thermal event from one battery cell to an adjacent one and thus improves flame retardancy. The size and shape of zeolite pores thus affect its catalytic activity because they exert a steric influence on the reactants, controlling the access of reactants and products.

Molecular sieves having a small pore framework (i.e., containing a maximum ring size of 8) have been found to be particularly useful in selective catalyst reduction (SCR) applications. Small pore molecular sieves include those having the following crystalline structure types: CHA, LEV, ERI, and AEI. Specific aluminosilicates and silico-aluminophosphates examples of molecular sieves having the CHA framework include SAPO-34, AlPO-34, and SSZ-13.

Aerogels

Aerogels may also be used as porous particles which may be used singly or alternatively with some or all of the flame-retardant particles disposed thereon. Aerogels are synthetic porous ultralight materials derived from a wet gel, in which the liquid component of the wet gel has been replaced with a gas without significant collapse of the gel structure. The result is a solid with extremely low density and extremely low thermal conductivity. Aerogels are good thermal insulators because they almost nullify two of the three methods of heat transfer—conduction (they are mostly composed of insulating gas) and convection (the microstructure prevents net gas movement). They are good conductive insulators because they are composed almost entirely of gases, which are very poor heat conductors. They are good convective inhibitors because air cannot circulate through the lattice.

Inorganic and organic aerogels may also be used as porous particles. Inorganic aerogels include silica aerogels, alumina aerogels, nickel-alumina aerogels, holmia aerogels, iron oxide aerogels, erbia aerogels, chromia aerogels, samaria aerogels, vanadia aerogels, neodymium oxide aerogels, or a combination thereof. The aerogels may be surface treated with surface treatments such as hexamethyldisilazane, trichloromethylsilane, and the like, which prevent moisture ingress into the porous particles.

Organic aerogel particles may include those obtained from biopolymers as well as those obtained from synthetic organic polymers.

Examples of biopolymers that may be used in the aerogels include cellulose, reduced crystallinity cellulose, polysaccharides, chitosan, oligochitosan, gelatin, collagen, hydroxyalkyl celluloses such as hydroxypropyl cellulose, hydroxymethyl cellulose and hydroxyethyl cellulose; sodium carboxymethyl cellulose, cellulose acetate, cellulose diacetate, cellulose triacetate, cellulose propionate, cellulose acetate butyrate, and cellulose ethers like ethyl cellulose, sugars (glucose, sucrose, lactose, galactose, fructose, mannitol, sorbitol, or a combination thereof), proteins, starch, pectin, alginate, starch sodium octenyl succinate, locust bean gum, carrageenan, agar, xanthan gum, guar gum, casein, whey protein isolate, soy protein isolate, pea protein isolate, potato protein isolate, zein, lecithin, stearic acid, beeswax, cottonseed wax, carnauba wax, milk fat, palm and palm kernel oil, or the like, or a combination thereof.

Synthetic polymers can also be used in the aerogels. The synthetic polymers are organic polymers and may be selected from a wide variety of thermoplastic polymers, blends of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Examples of thermoplastic polymers that can be used in the flame retardant composition (as foams) or as aerogels include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, poly etherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, poly sulfonamides, polyureas, polyphosphazenes, polysilazanes, polypropylenes, polyethylenes, polyethylene terephthalates, polyvinylidene fluorides, polysiloxanes, or the like, or a combination thereof.

Examples of thermosetting polymers that may be uses as foams (for binding the expandable and/or intercalated graphite) or as aerogels include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, resorcinol formaldehyde, phenol formaldehyde, melamine formaldehyde, cresol formaldehyde, phenol furfuryl alcohol, or the like, or a combination thereof. The biopolymer aerogels are preferred. Alginate based aerogels are preferred amongst the biopolymers.

The aerogels may be manufactured using supercritical extraction, freeze drying or a combination thereof. The polymeric aerogels may be blended with the flame retardant materials listed above.

Fumed Metal Oxides

Fumed metal oxides which are in the form of porous agglomerates of nanoparticles, are effective as thermally conductive solid components and can be used as porous particles in the first composition of the flame-retardant composition. Examples of fumed metal oxides are fumed silica, fumed alumina, fumed zirconia, fumed titania, or a combination thereof.

The porous particle has a high surface area and has a porosity of greater than 50% volume percent, preferably greater than 70 volume percent, and more preferably greater than 90 volume percent, based on the total volume of the porous substrate prior to impregnation with a transition metal precursor (detailed below) and the flame-retardant compound (detailed below).

The average pore sizes in the porous particle can be 5 Angstroms to 100 micrometers (μm), preferably 100 nanometers (nm) to 50 micrometers, and more preferably 150 nanometers to 20 micrometers. It is desirable for the porous substrate to contain a higher volume percentage of micrometer sized pores compared to the volume percentage of nanometer sized pores. This prevents the porous substrate from collapsing due to the collapse of the pores by virtue of capillary pressure when exposed to liquids (e.g., moisture, battery acid, and the like).

The porous particle can have a unimodal, bimodal or multimodal particle size distribution. Multimodal particle size distributions are preferred since these permit better packing of the particles of the first composition. The porous particles can have average particle sizes of 2 nanometers to 1000 micrometers, preferably 10 nanometers to 100 micrometers, and more preferably 50 to 10 micrometers.

Metal Organic Frameworks

Metal-organic frameworks (MOFs) are the fastest growing class of materials in chemistry today. They consist of interchangeable metal-containing nodes and carbon-based struts. There are more than 15,000 MOFs on record at the Cambridge Crystallographic Data Centre so the pool of materials to choose from is quite big.

MOFs have specific surface areas and micropore volumes that can exceed that of traditional adsorbents such as zeolites and activated carbons. MOFs are hybrid inorganic-organic frameworks that are assembled by the connection of Secondary Building Blocks (SBU), usually consisting of metal ions or clusters, through rigid organic ligands. The variety of cations and molecular bridges which can be combined in the framework yields an extended range of materials with diverse pore sizes and functionalities.

To successfully design adsorbents, it is necessary to have a full understanding of the adsorbent' structure including pore size/shape as well as the adsorbate properties. The adsorbates adhere to the surface by weak attractive interactions known as van der Waals forces. Adsorption occurs in pores whose diameter is close to twice the molecular diameter of the molecule being adsorbed which is why pore size distribution within the adsorbent is a determining factor. MOFs that exist so far can adsorb molecules of large micropores or even mesoporous range. Per IUPAC nomenclature microporous defined as pores smaller than 2 nm in diameter and mesoporous as pores with diameters between 2 and 50 nm. Pores sizes to be selected to provide easy diffusion paths for the adsorbate molecules to be desorbed from and diffuse out of the pore network.

Another material characteristic which may affect the adsorbate adsorption uptake is the presence of open metal sites so to some extent MOFs chemistry/functionality.

In some MOFs metal centers are bonded in specific coordination environment leaving the cation in the center open and accessible to the adsorbed gas molecules. Unsaturated metal sites have been shown to enhance certain adsorbate affinities compared to non-open metals.

It is to be noted that combinations of metal organic frameworks, zeolites, aerogels, fumed metal oxides, and the like can be used in combinations of two or more if desired. The porous particles may be added to the flame retardant composition in an amount of 1 to 20 wt %, preferably 2 to 15 wt %, based on the total weight of the flame retardant composition.

As noted above, the flame retardant layer 114 containing the exfoliated and/or intercalated graphite is arranged in such a manner that the graphite on expanding will form passages that direct the flow of hot combustible gases to ports that facilitate their egress from the battery module. This is depicted in the FIG. 2, which depicts the battery module 100 after activation of the expandable graphite in the flame retardant layer 114.

With reference now to the FIG. 2, it may be seen that the flame retardant layer 114 increases in thickness from $t_1$ to $t_2$ (i.e., $t_2 > t_1$) upon activation of the flame retardant layer. Upon undergoing an undesirable thermal event 202 which increases the temperature of the battery cells, hot gases are generated which promote expansion of the expandable graphite in the flame retardant layer 114. It may be seen that the graphite expands more in the region 114A than in the region 114B. This creates a narrower channel in one portion of the battery module than the channel near the port 112A. The narrower channel will cause generated gases to travel with a greater velocity towards the broader channel near port 112A, thus creating a current (of gas flow) (depicted by arrow(s) 300) towards the exit port 112A.

This selective expansion of the expandable graphite is designed to force hot gases to travel to the exit ports 112A and 112B so that they can escape from the battery module thus mitigating the effects of the thermal runaway. This channeling of the hot gases minimizes the effects of the undesirable thermal event by preventing it's spread to other battery cells.

Figure 3:
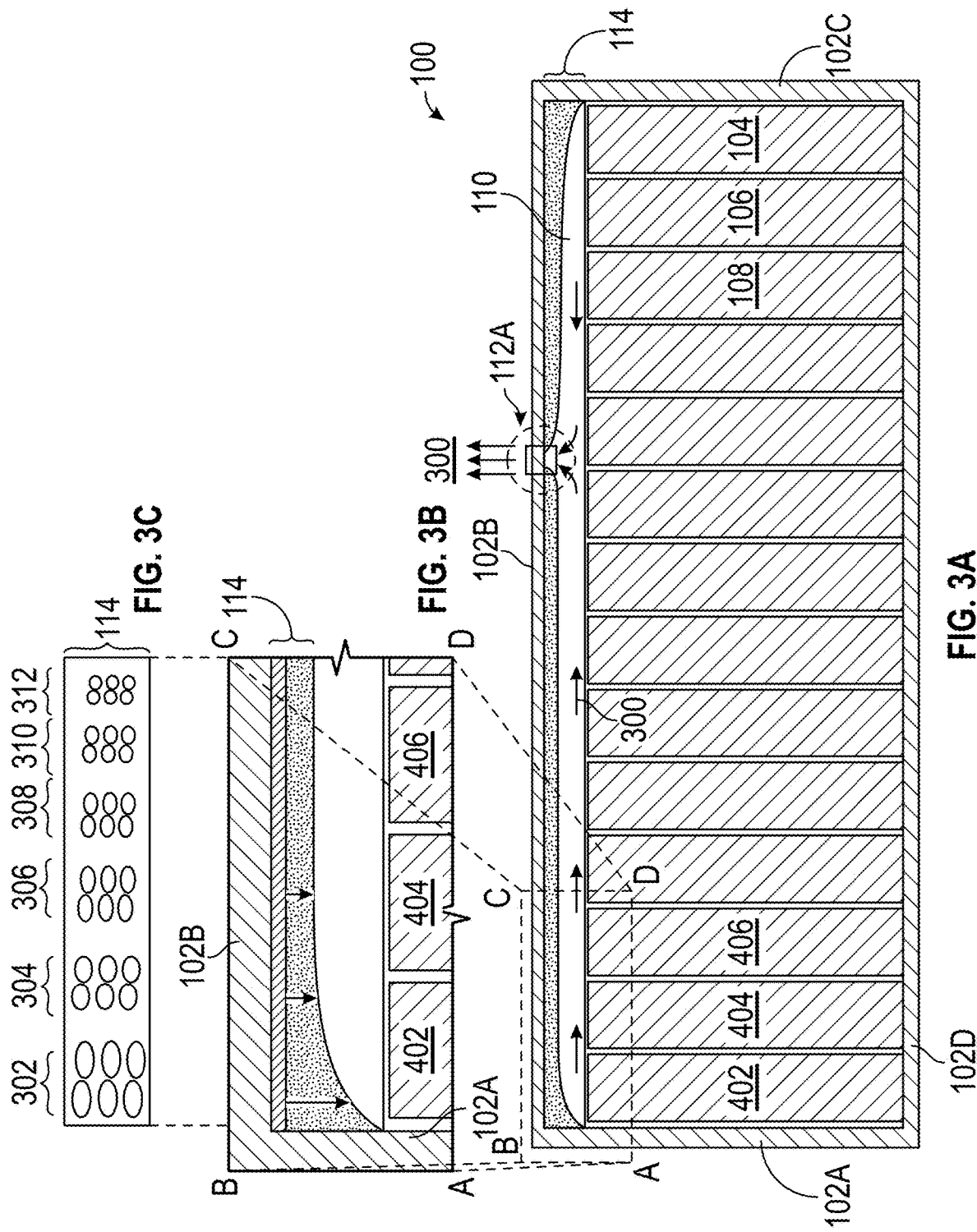
FIG. 3A depicts a flame retardant layer that permits hot gases to escape from the battery module upon activation of the flame retardant layer.
FIG. 3B depicts an expanded section ABCD from the FIG. 3A.
FIG. 3C depicts graphite particle size distribution in the flame retardant layer that permits hot gases to escape from the battery module after activation.

FIGS. 3A, 3B and 3C depict one manner of designing the flame retardant layer 114 so that the selective placement and expansion of the expandable graphite produces channels that permit hot gases to escape from the battery module 100. FIG. 3A depicts the expansion of the flame retardant layer 114 (upon activation of the expandable graphite) in the module 100. FIG. 3B is an expanded view of the section ABCD from the FIG. 3A. From the FIGS. 3A and 3B it may be seen that there are three battery cells 402, 404 and 406 in the module that are proximate to the left wall 102A. Battery cell 402 is closest to the wall 102A while cells 404 and 406 are respectively further from the wall 102A than battery cell 402. The flame retardant layer 114 is thicker proximate to the wall 102A (over battery cell 402) while it is thinner (than the region proximate the wall 102A) as the distance from the left wall 102A increases (over battery cell 404 and 406). This variation in thickness of the flame retardant layer 114 is achieved by selecting different expandable graphite sizes in different regions of the battery module.

FIG. 3C provides one exemplary embodiment of particle size distribution of expandable graphite that produces the thickness variations (seen in the FIGS. 3A and 3B) in the flame retardant layer 114 upon activation. In an embodiment, the expandable graphite has particles of different sizes that are arranged to facilitate differential expansion based on particle size that creates a channel for hot gases to escape. The expansion in the graphite is proportional to particle size. Larger particles will typically expand more than smaller particles. By placing larger particles in those regions (of the flame retardant layer 114) where a greater gas velocity is desired and smaller particles in those regions where a lower gas velocity is desired, channels may be created (upon activation) to create a gas flow current that drives the gases to one of the exit ports 112A.

In another embodiment, some expandable graphite particles are pre-expanded prior to inclusion in the flame retardant layer, which causes them to expand less during an thermal event. By using a combination of particles with different amounts of pre-expansion in the flame retardant layer, channels can be created during the thermal event to promote gas migration to the exit port 112A. It is to be noted that unexpanded particles of different initial particle sizes may be combined with pre-expanded particle sizes particles with different levels of pre-expansion to tailor expansion of the expandable graphite layer to produce channels that facilitate gas migration to the exit port 112A.

In the FIG. 3C it may be seen that the particles 302 that are proximate the left wall 102A are larger than those (304, 306, 310, 312) that are further away from the left wall 102A. As may be seen, particle size decreases with increasing distance from the left wall 102A. Since the larger graphite particles will expand more than the smaller particles, the largest particles 302 closest to the wall expand the most while those further away from the wall expand the least. The result is that the flame retardant layer after activation is thickest closest to the left wall 102A and its thickness is gradually reduced as the distance from the wall 102A increases. Thus, by carefully selecting particle sizes prior to expansion and by placing these different particle sizes strategically in the module 100, channels for hot gas flow can be created to drive the gases from the battery module 100.

In another embodiment, channels for gas discharge can be created by using a combination of pre-expanded graphite particles and unexpanded graphite particles. For example, with respect to the FIG. 3C, the particles 302 closest to the wall 102A may be those that are initially unexpanded while those particles 310, 312 that are further away from the wall may already be pre-expanded prior to being placed in the module 100. Upon experiencing a thermal event, the particles closest to the wall will undergo the largest expansion while those further away from the wall do not undergo much expansion. This would permit a thickness profile for the flame retardant layer that is similar to that displayed in the FIGS. 3A and 3B and facilitate discharge of undesirable hot gases 300 from the module.

Figure 4:
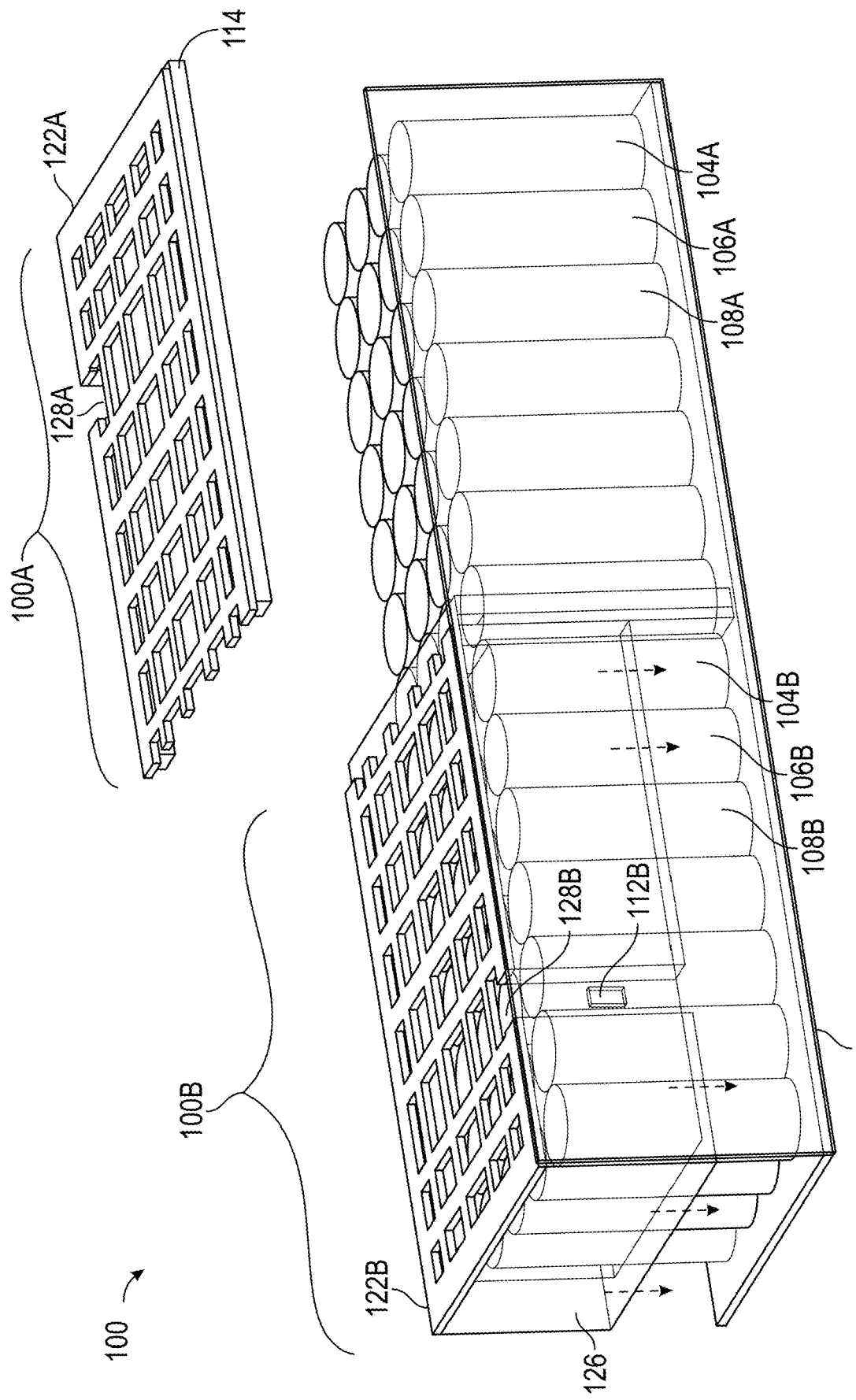
FIG. 4 is an exemplary schematic depiction of a battery module that has a thermal distribution plate for directing heat to an expandable graphite layer.

FIG. 4 depicts one embodiment of designing the battery module for rapid and preferential transmission of heat to the flame retardant layer 114 to channel the flow of undesirable gases out of the battery module 100. In the FIG. 4 a battery module 100 comprising two adjacent battery modules 100A and 100B are shown. Battery module 100A comprises a plurality of battery cells 104A, 106A, 108A, and so on, and battery module 100B comprises a plurality of battery cells 104B, 106B, 108B, and so on.

Both battery modules 100A and 100B contain a thermal distribution plate 122A and 122B respectively that is manufactured from a highly thermally conducting material such as for example aluminum, copper, or the like. In an embodiment, it is desirable for the thermal distribution plate has a higher coefficient of thermal conductivity than other materials used in the battery module. In one embodiment, the thermal distribution plate has the highest coefficient of thermal conductivity of all materials used in the battery module. It is desirable for the thermally conducting material to be a low density material in addition to being thermally conducting. The module 100A has its thermal distribution plate 122A provided in an isometric view to provide the viewer with an understanding of its construction while the module 100B has its thermal distribution plate located in position atop the battery cells 104B, 106B, 108B and so on. The thermal distribution plate is preferably located at the top of the battery module so that rising hot gases can transfer their heat to the plate faster than the surrounding walls thereby promoting rapid expansion of the expandable graphite. The rapid expansion of the expandable graphite causes the channeling of hot gases through the exit port 112B.

As can be seen, the flame retardant layer 114 is bonded to a surface of the thermal distribution plates that faces the battery cells 104A, 106A, 108A, and so on. The flame retardant layer 114 has a predetermined channel 128A and 128B in it to prevent the material from expanding into the path of gas travel. The predetermined channel is devoid of the flame retardant material 114. The high thermal conductivity of the thermal distribution plates causes it to heat more rapidly than the surroundings in the battery module when an thermal event occurs. The rapid heat transfer to the thermal distribution plate 122B causes a rapid heat transfer to the flame retardant layer causes it to expand as detailed above so that channels are created to promote hot gas flow out of the port 112B.

In the FIG. 4, the region 126 shows the downward growth (as depicted by the downward arrows) of the flame retardant layer 114 upon experiencing heat transfer from the heat distribution plate. Since the flame retardant layer 114 is located on the inner surface of the thermal distribution plate 122B it can only expand in the downward direction and does so while not obstructing the path of gas travel to the port 112B. The flame retardant layer 114 is distributed on the heat distribution plate 122B in such a manner that (upon being heated) it creates pathways for the gas to exit port 112B without any interference. In other words, predetermined channels 128 created in the flame retardant layer 114 prevent the flame retardant material from blocking the path of gas travel to exit ports 112B.

FIGS. 5A-5E depict various embodiments of the flame retardant layer 114. As may be seen in the embodiments depicted, the flame retardant layer 114 is always disposed on an inner surface of the upper wall 102B. The flame retardant layer may be disposed on an inner surface of any of the walls of the module 100 so long as its growth does not interfere with the growth of another flame retardant layer during the expansion process.

FIG. 5A depicts only the flame retardant layer 114 containing the expandable graphite layer 302 on an inner surface of the cover 102B. FIG. 5B details a flame retardant layer 114 that comprises a first layer 304 that contains the flame retardants detailed above (the metal oxides and metal hydroxides, phosphates, phosphorus-nitrogen containing compounds, and so on) and a second layer 302 that contains the expandable graphite.

FIG. 5C details a flame retardant layer that contains a thermal insulator layer 306 disposed atop the layer of expandable graphite 302. The thermal insulators may include aerogels, fumed metal oxides, and the like.

FIG. 5D details a flame retardant layer that contains a layer of expandable graphite 302 disposed atop a layer of graphite sheet heat spreader 308. Graphite sheet heat spreaders are flexible graphite sheets that are capable of cooling a hot component, protecting a temperature sensitive component, reducing a thermal gradient, or preventing a surface hot spot. Graphite sheet heat spreader comprises thin thermally conductive graphite with high thermal conductivity (up to 1800 W/m-K). The graphite sheet heat spreader typically has a thickness of 17 micrometers to 100 micrometers.

FIG. 5E details a flame retardant layer that comprises a plurality of different layers—notably a layer of thermally insulating materials 306 disposed atop a layer of flame retardant material 304, a layer of expandable graphite 302 and a layer of the graphite sheet heat spreader 308. The position of the layers may be interchanged as desired.

The battery module with the expandable graphite disclosed herein is advantageous because the expandable graphite flakes are capable of filling the voids inside a battery module to suppress an thermal event and impede the advection of heat to the neighboring cells during the thermal event. By varying expandable graphite particle size, packing density and layer thickness of expandable graphite can be used to create desirable gas escape routes in case of an thermal event (e.g., thermal runaway), so the high-temperature gases generated can be vented safely at desirable locations.

In addition, the design of the battery module where the expandable graphite is located at certain points adjacent to a thermal distribution plate may be used to facilitate pathway development (during an thermal event) to direct undesirable hot gases away from the source of the event.

While the above disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A battery module comprising:
   a plurality of battery cells encased in an outer shell; where the outer shell has disposed on an inner surface a flame retardant layer that comprises expandable graphite; where the expandable graphite is operative to expand during a thermal event that results in an increase in battery module temperature; where some expandable graphite particles are pre-expanded prior to inclusion in the flame retardant layer.

2. The battery module of claim 1, where the outer shell contains an exit port that is operative to permit the egress of hot gases and where the flame retardant layer expands to create channels that lead the hot gases to the exit port.

3. The battery module of claim 1, where the flame retardant layer is arranged to contact a thermal distribution plate that has a higher coefficient of thermal conductivity than a material used in the outer shell.

4. The battery module of claim 3, where the thermal distribution plate is arranged at a top of the battery module to contact rising hot gases.

5. The battery module of claim 1, where the expandable graphite undergoes exfoliation during a thermal event.

6. The battery module of claim 1, where the expandable graphite is intercalated with a flame retardant.

7. The battery module of claim 1, where the expandable graphite has particles of different sizes that are arranged to facilitate differential expansion based on particle size that creates a channel for hot gases.

8. The battery module of claim 1, where the flame retardant layer comprises unexpanded graphite particles of different initial particle sizes combined with the pre-expanded particles with different levels of pre-expansion to tailor expansion of the flame retardant layer to produce channels that facilitate gas migration to an exit port.

9. The battery module of claim 7, where particle size decreases with increasing distance from the outer shell.

10. The battery module of claim 7, where larger expandable graphite particles expand more than smaller expandable graphite particles and where a particle closest to the outer shell expands more than a particle located farther away from the outer shell when both encounter a thermal event.

11. The battery module of claim 1, where the flame retardant layer comprises a polymeric binder that encompasses the expandable graphite.

12. The battery module of claim 11, where the polymeric binder is a polyurethane or a polysiloxane.

13. The battery module of claim 3, where the flame retardant layer is arranged on an outer periphery of the thermal distribution plate and where the thermal distribution plate is manufactured from aluminum.

14. A method comprising:
disposing in a battery module a flame retardant layer; where the battery module comprises a plurality of battery cells encased in an outer shell; where the outer shell has disposed on an inner surface a flame retardant layer that comprises expandable graphite; where the expandable graphite is operative to expand during thermal event that results in an increase in battery module temperature; and where some expandable graphite particles are pre-expanded prior to inclusion in the flame retardant layer.

15. The method of claim 14, where the method further comprises arranging the expandable graphite to produce a channel that facilitates gas migration to an exit port during a thermal event.

16. The method of claim 14, further comprising disposing a thermal distribution plate atop of the battery module, where the thermal distribution plate contacts rising hot gases.

17. The method of claim 16, wherein the thermal distribution plate that has a higher coefficient of thermal conductivity than a material used in the outer shell.

18. The method of claim 14, wherein the expandable graphite is intercalated with a flame retardant.

19. The method of claim 14, wherein the expandable graphite has particles of different sizes that are arranged to facilitate differential expansion based on particle size that creates a channel for hot gases.

* * * * *